United States Patent Office 3,060,162
Patented Oct. 23, 1962

3,060,162
PROCESS OF REMOVING CATALYST RESIDUES FROM HYDROCARBON POLYMERS AND RESULTANT PRODUCTS
Cornelis E. P. V. van den Berg, Harmannus Bos, and Mathias J. G. Müytjens, all of Geleen, Netherlands, assignors to Stamicarbon N.V., Heerlen, Netherlands
No Drawing. Filed Apr. 25, 1958, Ser. No. 730,776
Claims priority, application Netherlands Apr. 29, 1957
10 Claims. (Cl. 260—93.5)

The present invention relates to the removal of catalyst residues from hydrocarbon polymers obtained by catalytic polymerization at low pressures i.e. below 100 atm.

The crude hydrocarbon polymers obtained at low pressures—below 100 atm.—by the use of so-called Ziegler-catalysts, e.g. polymers of ethylene, propylene, butylene and styrene, contain catalyst residues which have a detrimental influence on the quality of the polymers.

It is known to remove these catalyst residues by first treating the crude polymers with a small amount of alcohol and, thereafter, extracting the catalyst residues so converted with aqueous solutions of substances having an alkaline reaction, such as hydroxides, e.g. ammonium hydroxide or organic substances, such as amines, e.g. diethanol amine, or solutions containing surface-active substances in general. However, even the polymers purified in this way still contain, most often, catalyst residues.

Applicants have found that the removal of catalyst residues from hydrocarbon polymers obtained by catalytic polymerization at low pressures—below 100 atm.—can be effected in a simple manner and with good results, by first reacting with an alcohol the catalyst residues in a suspension of the crude polymers in a water-immiscible suspension liquid, and then removing the residues by means of water. More particularly, in applicants' process, the catalyst residues are reacted with an alcohol dissolved in the suspension liquid, and the catalyst residues are thereupon extracted from the suspension by dispersing an aqueous alcohol phase in the suspension and thereafter separating the aqueous alcohol phase which now contains the catalyst residues.

The polymers to be purified according to the invention are obtained by polymerization of hydrocarbons by means of Ziegler-catalysts. These catalysts are formed by reacting compounds of transition metals of the 4th–8th groups with hydrocarbon or hydrogen compounds of non-transition metals of the 1st–3rd groups of the periodic system. Examples of such Ziegler-catalysts are the products obtained by reaction of:

Titanium tetrachloride with alkyl aluminium dichloride
Titanium tetrachloride with dialkyl zinc and aluminium trichloride
Titanium tetrachloride with dialkyl cadmium and aluminium trichloride
Titanium tetrachloride with dialkyl zinc and alkyl aluminium sesquibromide
Titanium tetrachloride with zinc halogenide and trialkyl aluminium
Titanium tetrachloride with cadmium halogenide and trialkyl aluminium
Titanium tetrachloride with sodium hydride
Ferric chloride with lithium ethyl
Zirconium tetrachloride with calcium hydride
Vanadium chloride with triethyl borium
Tungsten chloride with diphenyl aluminium monochloride
Titanium tetrachloride and ferric chloride with alkyl aluminium halogenide
Titanium tetrachloride and chromium oxychloride with the complex $NaAl(C_2H_5)_3H$
Titanium tetrachloride and molybdenum chloride with alkyl aluminium halogenide
Titanium tetrachloride and vanadium chloride with zinc halogenide and trialkyl aluminium
Titanium trichloride with diethylaluminium monochloride
Titanium tetrabutylate with ethyl aluminium sesquichloride In the preparation of a Ziegler-catalyst the starting materials are usually brought together in a dispersing agent so as to produce a reaction and to thereby obtain a suspension of the catalyst.

The polymerization is carried out by dispersing the hydrocarbon to be polymerized—e.g. ethylene, propylene, butylene or styrene— in the catalyst suspension, at normal or moderately raised pressure, below 100 atm. The polymerization can also be carried out simultaneously with the reaction which produces the catalyst. The reaction product of the polymerization consists of polymers of high molecular weight dispersed in the suspension liquid with catalyst residues enclosed in the polymer particles.

According to another way of realizing the invention, the starting materials for the catalyst preparation are dispersed in the gaseous hydrocarbon to be polymerized. In this way, there are obtained solid hydrocarbon polymers containing catalyst residues.

In the process according to the invention, the removal of the catalyst residues is started from a suspension of the polymers to be purified in a water immiscible suspension liquid. The suspension may have been obtained as such as the reaction product of the polymerization, if the polymerization has been carried out in the suspension liquid. Consequently, it is not necessary to first separate the polymers from the suspension liquid or to use a pre-purification treatment.

If the polymer to be purified is a dry solid substance, it is finely dispersed in the suspension liquid.

Examples of water-immiscible suspension liquids are hydrocarbons, preferably aliphatic or cyclo-aliphatic hydrocarbons, such as pentane, hexane, cyclohexane, heptane and kerosene, and halogenated hydrocarbons, such as tetrafluoro-dichloroethane.

To remove the catalyst residues, the latter are contacted with an alcohol. To this end, the alcohol is dissolved in the suspension liquid, and stirring can be employed to promote contact between the alcohol and the polymer particles containing the catalyst residues.

Any alcohol can be chosen as alcohols are generally soluble in the suspension liquids used e.g. hydrocarbons. Examples of readily available, suitable alcohols are methanol, ethanol, isopropanol, butanol, cyclohexanol, cyclopentanol and benzyl alcohol. As is apparent from these examples, the use of alcohols which are sparingly soluble in water, such as butanol, is also possible.

The amount of alcohol dissolved should be sufficient to convert all of the catalyst residue present. However, in comparison with the amount of the suspension liquid, the quantity of alcohol needed is small and does not, in most cases, exceed 10% by volume and, preferably, 1–3% by volume of the amount of suspension liquid. In some cases, it is important to use a greater quantity of alcohol, e.g. 30–50% by volume as compared with the amount of suspension liquid, as will be explained below.

The catalyst residue converted by the reaction with alcohol is extracted from the suspension in that an aqueous alcohol phase is dispersed in the suspension and is thereafter separated therefrom. In carrying out this extraction there is used a mixture of water and alcohol, so that there is obtained an aqueous alcohol phase in which the converted catalyst residue is easily soluble. The amount of the aqueous alcohol phase need not be larger than half of the amount of suspension liquid. It is preferred to use an amount of aqueous alcohol phase equal to 10–50% by volume of the amount of suspension liquid. Instead of using large amounts of aqueous alcohol, it is recommended to repeat the extraction with a fresh amount of aqueous alcohol.

If the aqueous alcohol phase is obtained by adding water and alcohol to the suspension, then it is not necessary to use for this purpose the same alcohol as has previously been dissolved in the suspension liquid. For instance, it is possible to dissolve 1–3% by volume of butanol in the suspension liquid for the reaction with the catalyst residue and then prepare the aqueous alcohol phase by the addition of aqueous methanol—preferably containing 70–90% methanol.

If the large amount of alcohol e.g. 30–50% by volume of ethanol, is dissolved in the suspension liquid for reaction with the catalyst residue, then the aqueous alcohol phase can be obtained in a simple manner by adding water only to the suspension.

The concentration of the alcohol in the aqueous alcohol phase can be varied. Preferably, the aqueous alcohol phase has a high alcohol content, e.g. an ethanol content of 60% by volume or a methanol content of 80–90% by volume. However, the use of lower alcohol concentrations, e.g. an isopropanol content of 20–40% by volume, is also permissible, and the extraction can also be repeated several times.

When the aqueous alcohol phase is separated from the suspension liquid, the polymers remain suspended in the suspension liquid.

The purified polymers can be separated from the suspension liquid in a known manner, e.g. by centrifuging. The polymers obtained by the process according to the invention have a very low ash content, generally lower than 0.01% by weight, and are non-corrosive.

*Example 1*

40 mmol. of titanium tetrachloride, 100 mmol. of tripropyl aluminium, 250 cm.$^3$ of N.heptane, and 100 g. of 1-butylene are fed into a closed cylindrical vessel (capacity 1 litre) in which the air has been replaced by nitrogen. The reaction vessel is revolved about its axis for 5 hours (10 r.p.m.), at a temperature of 80° C. After cooling to room temperature, the contents of the vessel are filtered in a nitrogen atmosphere, whereupon there is obtained 51 g. of crude, solid polybutylene.

In order to remove the catalyst residue contained in the product, the polymer is suspended in 250 ccm. of N.heptane and 20 ccm. of butanol is dissolved in the suspension liquid; thereupon, stirring is applied for 1 hour. 60 ccm. of aqueous methanol (methanol content, 80% by volume) are then dispersed in the suspension following which, the aqueous alcohol phase is separated out. After a new extraction with 60 ccm. of aqueous methanol, the suspension is filtered, and the last traces of liquid are evaporated from the resulting purified polymer. The purified polymer (42 g.) does not show corrosive properties.

*Example 2*

In a manner analogous to that described in Example 1, 180 g. of propylene are polymerized by means of 25 mmol. of titanium trichloride and 50 mmol. of diethyl aluminium monochloride in 250 ccm. of N.heptane. From the resulting 105 g. of solid propylene polymer the catalyst residue is removed in the same manner as described in Example 1.

To this end the crude polypropylene is suspended in 500 ccm. of N.heptane, 15 ccm. of butanol is dissolved in the suspension liquid and, after stirring for 1 hour there are carried out two successive extractions with 100 ccm. of an aqueous solution containing 80% by volume of methanol.

The polymer purified in this way (98 g.) does not show corrosive properties.

*Example 3*

In a manner similar to that described in Example 1, 150 g. of styrene is polymerized by means of 40 mmol. of vanadium tetrachloride and 100 mmol. of triethyl aluminium in 250 ccm. of N.heptane. From the resulting 99 g. of solid polystyrene, the catalyst residue is removed in a manner similar to that described in Example 2. In this process, 30 ccm. of butanol is dissolved in the suspension liquid and extraction is carried out twice, first with 100 ccm. and then, with 50 ccm. of an aqueous solution containing 80% by volume of methanol.

*Example 4*

A suspension of crude polyethylene in N.heptane is prepared by feeding ethylene with stirring into N.heptane to which have been added titanium tetrachloride and diisobutyl aluminium monochloride (molar ratio 1:1).

At 55–60° C., 10 ccm. of methanol per litre of heptane is added to the suspension obtained as the reaction product, and which suspension contains 260 g. of crude polyethylene per litre of heptane; as a result of this treatment, a small amount of undissolved alcohol phase is formed. After one hour of stirring, an extraction is carried out with 150 ccm. of aqueous methanol (methanol content, 80% by volume) per litre of heptane, likewise at a temperature of 55–60° C. The aqueous alcohol phase is separated off and the polymer is then separated, by centrifuging, from the suspension liquid, which is still warm. The resulting polymer does not show corrosive properties.

*Example 5*

The treatments described in Example 4 are repeated with a fresh amount of polyethylene suspension with this difference that, instead of methanol, 10 ccm. of butanol is dissolved in the suspension liquid. Proceeding in this way, the corrosive components are also removed from the polymer.

*Example 6*

A suspension of crude polyethylene in N.hexane is prepared by passing ethylene, while stirring, into N.hexane to which have been added titanium tetrachloride and diethyl aluminium monochloride (molar ratio 5:6). To an amount of the suspension obtained as the reaction product consisting of one litre of hexane and 190 g. of crude polyethylene—there is added 10 ccm. of water-free ethanol which is dissolved in the suspension liquid. After stirring for 1 hour at a temperature of 55–60° C., an extraction is carried out at the same temperature with 200 ccm. of an aqueous solution containing 60% by volume of ethanol. The polymer which is thereafter separated from the suspension liquid does not show corrosive properties.

*Example 7*

A suspension of polyethylene prepared in the manner described in Example 6 is filtered and the adhering liquid is evaporated from the polyethylene.

200 g. of this polyethylene is suspended in 1 litre of benzene and an additional 200 g. is suspended in 1 litre of carbon tetrachloride. To each of these suspensions there is added 10 ccm. of ethanol, which ethanol is dissolved in the suspension liquid. After one hour of stirring at 55–60° C., the two suspensions are extracted, each with 200 ccm. of an aqueous solution containing 60% by volume of ethanol. The polymer which is thereafter separated from the two suspensions does not show corrosive properties.

*Example 8*

In a manner similar to that described in Example 6, the purification of polyethylene suspended in kerosene is carried out by dissolving 3% by volume of cyclohexanol in the suspension liquid and extracting, after one hour of stirring, at 60° C. with 25% by volume, based on the suspension liquid, of an aqueous solution of isopropanol (alcohol content, 40% by volume).

The corrosive catalyst residue can be removed in a similar way by dissolving in the suspension liquid 2% by volume of isopropanol instead of cyclohexanol and thereafter, carrying out an extraction in the same way as described above.

*Example 9*

Purification is applied to a suspension of polyethylene in N.heptane which was prepared with the use of titanium tetrachloride and dipropyl aluminium monochloride (molar ratio 6:7) as starting materials for the catalyst.

To an amount of suspension containing 1 litre of heptane and 200 g. of crude polyethylene, there are added 150 ccm. isopropanol which are dissolved in the suspension liquid, after which, stirring is applied for one hour at a temperature of 65-70° C. Subsequently, 250 ccm. of water (temperature 70° C.) are dispersed in the suspension and, thereupon, the aqueous alcohol phase is separated out. The polymer which is then separated from the suspension liquid does not show corrosive properties.

*Example 10*

In a manner similar to that described in Example 9, the catalyst residue is removed from a polyethylene suspension containing 1 litre of N.heptane and 200 g. of crude polyethylene. Instead of isopropanol, 200 ccm. of methanol is now dissolved in the suspension liquid; an alcohol phase does not form here. After one hour of stirring at 60° C., 100 ccm. of water (temperature likewise 60° C.) is dispersed in the suspension and the aqueous alcohol phase is thereupon separated off. The polymer separated from the suspension liquid by centrifuging does not show corrosive properties.

Applicants have further discovered that in carrying out the above described process, good results are obtained even when only small amounts of alcohol and water are used. Thus, applicants have found that the process permits removal of the catalyst residues when not more than 10% by volume of alcohol, based on the volume of suspension liquid used, is added to the suspension and dispersed therein, followed by the addition of an amount of water smaller than 25% by volume of the added amount of alcohol; there is produced thereby an aqueous alcohol phase which is separated from the suspension.

When the alcohol that is generally added to the suspension is dispersed therein e.g. by stirring, it dissolves completely in the suspension liquid. If the alcohol does not dissolve completely, it is advisable to separate the undissolved alcohol phase from the suspension.

By adding only a small amount of water, an aqueous alcohol phase is obtained. It is not necessary to use large amounts of water, as an amount of water smaller than 25% by volume of the amount of alcohol added is sufficient. If more water is added, the alcohol content of the aqueous alcohol phase becomes lower, as a result of which the contact with the catalyst residues in the hydrophobic polymer particles is reduced. Preferably, there is used an amount of water which is about 10% by volume of the amount of alcohol added.

After the removal of the aqueous alcohol phase, the remainder of the alcohol can be removed from the suspension by washing with water, so that no alcohol remains in the suspension liquid, which facilitates the recovery of this liquid after the polymer particles have been separated off.

According to a preferred way of realizing the process according to the invention, the separation of the aqueous alcohol phase from the suspension is followed by a new addition to the suspension of not more than 10% by volume of alcohol, as compared with the amount of suspension liquid, which alcohol is then dispersed in the liquid, following which an amount of water, less than 25% by volume as compared with the amount of alcohol added, is added in order to form an aqueous alcohol phase, which is separated from the suspension. In this process, the same alcohol can be used as in the first alcohol treatment, although the use of a different alcohol is also permissible. For example, the first treatment can be carried out with ethanol or butanol, and the second with methanol.

*Example 11*

Purification treatment is applied to a suspension of 1500 g. of crude ethylene polymer in 20 litres of gasolene, obtained by polymerization of ethylene by means of a catalyst (catalyst components: titanium tetrachloride and diisobutyl aluminium chloride) dispersed in a light gasolene (boiling range 60-75° C.). The ash content of the crude polymer is 0.25% by weight. 1 litre of methanol is dispersed in the suspension by stirring (at a temperature of 47° C.) following which 370 ccm. of liquid is removed in the form of a bottom layer containing methanol and gasolene. Subsequently, 100 ccm. of water is dispersed in the suspension by stirring, the temperature being kept at 47° C. The aqueous alcohol phase formed in the process separates out as the bottom layer (volume 556 ccm.).

After this, 800 ccm. of methanol is added to the suspension and dispersed in it by stirring at a temperature of 47° C. Subsequently, 100 ccm. of water is dispersed in the suspension by stirring, whereby there is formed an aqueous alcohol phase which separates out as the bottom layer (volume 785 ccm.).

Next, the purified suspension is led into a pulse column in which it is washed with water, while being pulsated continuously, in order to remove the methanol following which, the polymer particles are separated from the suspension by means of a centrifuge. The ash content of the purified ethylene polymer, which does not show corrosive properties, is lower than 0.01% by weight.

From the centrifuged liquid, the gasolene is recovered by simple distillation.

With the term mmol. as used herein is meant millimol.

We claim:

1. Process for removing catalyst residues contained in crude hydrocarbon polymers obtained by catalytic polymerization of alkenes containing up to 8 carbon atoms at pressures below 100 atm. with a catalyst formed by mixing a halide of a transition metal of the 4th to 8th groups of the periodic system with a compound of a non-transition metal of the 1st to 3rd groups of the periodic system, in which compound at least one member of the group consisting of hydrocarbons and hydrides is attached to said non-transition metal, comprising the steps of suspending said crude polymer in a water-immiscible liquid taken from the group consisting of hydrocarbons and halogenated hydrocarbons, dissolving in said water-immiscible liquid an alcohol capable of reacting with the catalyst residues in said polymer, reacting said catalyst residues with said alcohol to form a suspension of said polymer in a first liquid phase containing reacted catalyst residues dissolved in said first liquid phase, forming a second liquid phase by adding to said suspension a liquid selected from the group consisting of water and aqueous alcohol, mixing said first and said second liquid phases and subsequently separating said first liquid phase in which said polymer is maintained suspended from said second liquid phase now containing said reacted catalyst residues dissolved therein.

2. Process according to claim 1, wherein the volume of the second liquid phase amounts to 10 to 50% of the volume of the water-immiscible liquid used.

3. Process according to claim 1, wherein the total amount of alcohol added does not exceed 10% by volume of the water-immiscible liquid used.

4. Process according to claim 3, wherein the second liquid phase is formed by adding to said suspension an amount of water not in excess of 25% by volume of the amount of alcohol dissolved in said first liquid phase.

5. Process according to claim 3, wherein the second liquid phase is formed by adding to said suspension an amount of water equal to about 10% by volume of the amount of alcohol dissolved in said first liquid phase.

6. Process according to claim 1, wherein the polymer is recovered from the said first liquid phase after separation of said second liquid phase.

7. Process according to claim 1, characterized in that following the separation of the said second liquid phase, the said first liquid phase in which the polymer is maintained suspended is subjected to further extraction with aqueous alcohol.

8. Process according to claim 7, wherein the alcohol used in said further extraction is chemically different from the alcohol initially used for dissolving in said water-immiscible liquid.

9. Process according to claim 1, wherein the said second liquid phase is formed by adding to said suspension an aqueous alcohol which is chemically different from the alcohol initially used for dissolving in said water-immiscible liquid.

10. Process according to claim 1, wherein alcohol is used selected from the group consisting of methanol, ethanol, isopropanol, butanol, cyclohexanol, cyclopentanol and benzyl alcohol.

References Cited in the file of this patent

UNITED STATES PATENTS

| | | |
|---|---|---|
| 2,342,400 | Hopff et al. | Feb. 22, 1944 |
| 2,832,759 | Nowlin et al. | Apr. 29, 1958 |
| 2,843,577 | Friedlander et al. | July 15, 1958 |
| 2,944,048 | Nowlin | July 5, 1960 |